United States Patent
Kayano et al.

(10) Patent No.: US 9,494,347 B2
(45) Date of Patent: Nov. 15, 2016

(54) REFRIGERATION CYCLE DEVICE

(71) Applicant: DENSO CORPORATION, Kariya, Aichi-pref. (JP)

(72) Inventors: Kenta Kayano, Obu (JP); Haruyuki Nishijima, Obu (JP); Etsuhisa Yamada, Kariya (JP); Yoshiaki Takano, Kosai (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 149 days.

(21) Appl. No.: 14/413,131

(22) PCT Filed: Jun. 20, 2013

(86) PCT No.: PCT/JP2013/003850
§ 371 (c)(1),
(2) Date: Jan. 6, 2015

(87) PCT Pub. No.: WO2014/010178
PCT Pub. Date: Jan. 16, 2014

(65) Prior Publication Data
US 2015/0176868 A1 Jun. 25, 2015

(30) Foreign Application Priority Data
Jul. 9, 2012 (JP) .................... 2012-153319

(51) Int. Cl.
*F25B 13/00* (2006.01)
*F25B 1/06* (2006.01)
(Continued)

(52) U.S. Cl.
CPC .......... *F25B 13/00* (2013.01); *F25B 1/06* (2013.01); *F25B 1/10* (2013.01); *F25B 41/04* (2013.01); *F25B 2341/0012* (2013.01); *F25B 2341/0013* (2013.01); *F25B 2341/0014* (2013.01); *F25B 2341/0662* (2013.01); *F25B 2400/23* (2013.01); *F25B 2500/18* (2013.01)

(58) Field of Classification Search
CPC .......... F25B 1/06; F25B 2341/0012; F25B 2341/0014; F25B 2341/0013
See application file for complete search history.

(56) References Cited

U.S. PATENT DOCUMENTS

| 5,526,650 A | 6/1996 | Iritani et al. |
| 5,704,219 A | 1/1998 | Suzuki et al. |

(Continued)

FOREIGN PATENT DOCUMENTS

| JP | 2001241797 A | 9/2001 |
| JP | 3257361 B2 | 2/2002 |

(Continued)

OTHER PUBLICATIONS

Machine Translation of Description of JP-4595654.*
(Continued)

*Primary Examiner* — Orlando Aviles Bosques
(74) *Attorney, Agent, or Firm* — Harness, Dickey & Pierce, P.L.C.

(57) ABSTRACT

In a heating mode, a refrigerant circuit is switched in which a refrigerant is decompressed by an ejector to flow into a gas-liquid separator, and a separated gas phase refrigerant is introduced into an intermediate-pressure suction port of a compressor and at the same time a separated liquid phase refrigerant flows to at least a second variable throttle valve, an interior evaporator, and a suction port of the compressor, in this order. In a cooling mode, a refrigerant circuit is switched in which the refrigerant flowing out of the interior condenser is decompressed by a first variable throttle valve through an exterior heat exchanger to flow into the gas-liquid separator, and a separated gas phase refrigerant is introduced into the intermediate-pressure suction port of the compressor, and at the same time a separated liquid phase refrigerant flows to the second variable throttle valve, the interior evaporator, and the suction port of the compressor, in this order.

4 Claims, 3 Drawing Sheets

HEATING MODE (51) Int. Cl.
  *F25B 1/10* (2006.01)
  *F25B 41/04* (2006.01)

(56) References Cited

U.S. PATENT DOCUMENTS

| | | |
|---|---|---|
| 2002/0000095 A1 | 1/2002 | Takeuchi et al. |
| 2011/0005268 A1 | 1/2011 | Oshitani et al. |
| 2013/0312447 A1 | 11/2013 | Inaba et al. |

FOREIGN PATENT DOCUMENTS

| | | | |
|---|---|---|---|
| JP | 3331604 B2 | 10/2002 | |
| JP | 3331765 B2 | 10/2002 | |
| JP | 2003014318 A | 1/2003 | |
| JP | 2009133624 A | 6/2009 | |
| JP | 2009276048 A | 11/2009 | |
| JP | 4595654 B2 * | 12/2010 | ............... F25B 1/10 |
| JP | 2011257094 A | 12/2011 | |
| JP | 2012181005 A | 9/2012 | |

OTHER PUBLICATIONS

U.S. Appl. No. 14/373,862, Yamada et al, filed Jul. 22, 2014.
International Search Report and Written Opinion (in Japanese with English Translation) for PCT/JP2013/003850, mailed Aug. 27, 2013; ISA/JP.

* cited by examiner

FIG. 1  HEATING MODE

FIG. 2  COOLING MODE

FIG. 3

HEATING MODE

FIG. 4

COOLING MODE

FIG. 5

REFRIGERATION CYCLE DEVICE

CROSS REFERENCE TO RELATED APPLICATIONAPPLICATIONS

This application is a U.S. National Phase Application under 35 U.S.C. 371 of International Application No. PCT/JP2013/003850 filed on Jun. 20, 2013 and published in Japanese as WO 2014/010178 A1on Jan. 16, 2014. This application is based on and claims the benefit of priority from Japanese Patent Application No. 2012-153319 filed on Jul. 9, 2012. The entire disclosures of all of the above applications are incorporated herein by reference.

FIELD OF THE INVENTION

The present disclosure relates to a refrigeration cycle device configured to switch a refrigerant circuit.

BACKGROUND ART

Conventionally, Patent Document 1 discloses a vapor compression type refrigeration cycle device configured to be capable of switching between a refrigerant circuit in a heating mode, which heats ventilation air as a heat exchange target fluid to perform heating of an air conditioning target space, and a refrigerant circuit in a cooling mode which cools ventilation air to perform cooling of the air conditioning target space.

In addition, the refrigeration cycle device of Patent Document 1 forms a gas injection cycle (economizer type refrigeration cycle) which joins an intermediate-pressure gas phase refrigerant in the cycle to a refrigerant in a compression process by a compressor even when a refrigerant circuit of any one operation mode of the heating and cooling modes is switched. Accordingly, the refrigeration cycle device of Patent Document 1 improves compression efficiency of the compressor in both operation modes so as to enhance a coefficient of performance (COP) of the refrigeration cycle device.

Meanwhile, as a cycle configuration aimed to enhance a COP of a refrigeration cycle device, there has been known an ejector type refrigeration cycle adapting an ejector as a refrigerant pressure reducer as disclosed in Patent Document 2, besides the gas injection cycle. Such an ejector type refrigeration cycle absorbs a refrigerant flowing out of an evaporator by absorption action of an injection refrigerant injected from a nozzle section of the ejector so as to recover a loss of kinetic energy caused when the refrigerant is decompressed by the nozzle section.

Then, the recovered kinetic energy and kinetic energy of the injection refrigerant are converted into pressure energy by a diffuser section of the ejector. Accordingly, in the ejector type refrigeration cycle, since a suction-side refrigerant pressure of a compressor may be increased, driving power of the compressor is reduced compared to a typical refrigeration cycle device having an expansion valve. Consequently, a COP of the ejector type refrigeration cycle is enhanced.

CITATION LIST

Patent Document

[Patent Document 1]
Japanese Patent No. 3257361 (corresponding to U.S. Patent Publication No. 5,704,219)

[Patent Document 2]
Japanese Unexamined Patent Application Publication No. 2003-14318 (corresponding to U.S. Unexamined Patent Application Publication No. 2002/0000095)

SUMMARY OF INVENTION

According to the examination of the present inventors, a COP may be further enhanced by applying an ejector to a gas injection cycle. However, the ejector typically has three refrigerant inflow/outflow ports such as a refrigerant inflow port through which a high-pressure refrigerant flows into a nozzle section, a refrigerant suction port through which a refrigerant flowing out of an evaporator is introduced, and a refrigerant outflow port through which a refrigerant having a pressure increased by a diffuser section flows out to the outside. For this reason, the ejector may not be applied to the refrigeration cycle device of Patent Document 1 without changing a refrigerant circuit configuration.

Furthermore, no ejector type refrigerant cycle, which is capable of forming a gas injection cycle in a plurality of operation modes having different refrigerant circuits, is disclosed in Patent Document 1. In addition, in a case in which the ejector is applied by changing a cycle configuration of the refrigeration cycle device of Patent Document 1, when the gas injection cycle is configured in the plurality of operation modes having different refrigerant circuits, the cycle configuration may be extremely complicated.

An object of the present disclosure is to provide a refrigeration cycle device having an ejector as a refrigerant pressure reducer configured to form a gas injection cycle in a plurality of operation modes having different refrigerant circuits.

Another object of the present disclosure is to provide a refrigeration cycle device having an ejector as a refrigerant pressure reducer configured to form a gas injection cycle in a plurality of operation modes having different refrigerant circuits without causing a complicated cycle configuration.

A refrigeration cycle device according to an aspect of the present disclosure includes a compressor, a first utilization-side heat exchanger, a second utilization-side heat exchanger, an exterior heat exchanger, an ejector, a gas-liquid separation section, an intermediate-pressure refrigerant passage, a first variable throttle valve, a second variable throttle valve, and a refrigerant circuit switching section. The compressor introduces, compresses, and then discharges a refrigerant. The first utilization-side heat exchanger exchanges heat between a high-pressure refrigerant discharged from a discharge port of the compressor and a heat exchange target fluid. The second utilization-side heat exchanger exchanges heat between the refrigerant and the heat exchange target fluid, and causes the refrigerant to flow out to a suction port of the compressor. The exterior heat exchanger exchanges heat between the refrigerant and outside air. The ejector has a pressure boosting section in which an injection refrigerant jetted from a nozzle section, which decompresses the refrigerant, is mixed with a suction refrigerant drawn from a refrigerant suction port by absorption action of the injection refrigerant jetted from the nozzle section, so as to increases a pressure of the refrigerant. The gas-liquid separation section separates the refrigerant flowing out of the ejector into gas phase refrigerant and liquid phase refrigerant. The intermediate-pressure refrigerant passage causes the gas phase refrigerant separated in the gas-liquid separation section to be introduced to an intermediate-pressure suction port provided in the compressor and to be joined to a refrigerant in a compression process of the compressor. The first variable throttle valve decompresses the refrigerant flowing through a refrigerant passage that connects the exterior heat exchanger to the gas-liquid separation section. The second variable throttle valve decompresses the refrigerant flowing through a refrigerant passage that connecting the second utilization-side heat exchanger to the gas-liquid separation section. Furthermore, the refrigerant circuit switching section switches a refrigerant circuit in which the refrigerant is circulated in a cycle.

Specifically, the refrigerant circuit switching section may be configured such that, in a first operation mode, the refrigerant flowing out of the first utilization-side heat exchanger flows into the nozzle section. In addition, in the first operation mode, the liquid phase refrigerant separated in the gas-liquid separation section may flow into the second utilization-side heat exchanger through the second variable throttle valve and at the same time the liquid phase refrigerant separated in the gas-liquid separation section may flow to the first variable throttle valve, the exterior heat exchanger, and the refrigerant suction port in this order. In a second operation mode, the refrigerant flowing out of the first utilization-side heat exchanger may flow to the exterior heat exchanger, the first variable throttle valve, and the gas-liquid separation section in this order. In addition, in the second operation mode, the liquid phase refrigerant separated in the gas-liquid separation section may flow into the second utilization-side heat exchanger through the second variable throttle valve.

According to the refrigeration cycle device of the present disclosure, in the first operation mode, the intermediate-pressure refrigerant decompressed by the ejector may be separated into gas phase refrigerant and liquid phase refrigerant in the gas-liquid separation section, and the gas phase refrigerant separated by the gas-liquid separation section may be introduced into the intermediate-pressure suction port of the compressor to be joined to a refrigerant in a compression process of the compressor. That is, a gas injection cycle can be configured in the first operation mode.

In addition, in the second operation mode, the intermediate-pressure refrigerant decompressed by the first variable throttle valve may be separated into gas phase refrigerant and liquid phase refrigerant in the gas-liquid separation section, and the gas phase refrigerant separated by the gas-liquid separation section may be introduced into the intermediate-pressure suction port of the compressor to be joined to the refrigerant in the compression process of the compressor. That is, a gas injection cycle can be configured in the second operation mode.

Accordingly, in the refrigeration cycle device including the ejector as a refrigerant pressure reducer, a gas injection cycle can be configured in a plurality of different operation modes to be different from the refrigerant circuit.

Furthermore, in the first operation mode, since the liquid phase refrigerant separated in the gas-liquid separation section flows into the second utilization-side heat exchanger through the second variable throttle valve and at the same time the liquid phase refrigerant separated in the gas-liquid separation section flows into the exterior heat exchanger through the first variable throttle valve, the second utilization-side heat exchanger and the exterior heat exchanger may be connected in parallel with each other with respect to the refrigerant flow.

Consequently, for example, by adjusting opening degrees of the second and first variable throttle valves such that a refrigerant evaporation temperature in the second utilization-side heat exchanger is greater than a refrigerant evaporation temperature in the exterior heat exchanger, a frost can be suppressed from occurring on the second utilization-side heat exchanger and an amount of heat absorption of the refrigerant in the exterior heat exchanger can also be increased.

In more detail, in the first operation mode, a decompression amount of refrigerant in the first variable throttle valve may be greater than a decompression amount of refrigerant in the second variable throttle valve.

Moreover, in the second operation mode, since the refrigerant flowing out of the exterior heat exchanger flows into the gas-liquid separation section through the first variable throttle valve, the refrigerant in the exterior heat exchanger may flow backward in the first operation mode. Thereby, the first variable throttle valve, which is a necessary component to decompress the intermediate-pressure refrigerant until the intermediate-pressure refrigerant becomes a low-pressure refrigerant in the first operation mode, can be used to decompress the high-pressure refrigerant until the high-pressure refrigerant becomes an intermediate-pressure refrigerant in the second operation mode.

Accordingly, in the refrigeration cycle device including the ejector as a refrigerant pressure reducer, a complicated cycle configuration cannot be caused and the gas injection cycle may be configured in a plurality of different operation modes different from the refrigerant circuit.

DESCRIPTION OF EMBODIMENTS

[First Embodiment]

Hereinafter, a first embodiment of the present disclosure will be described with reference to FIGS. 1 to 4. In the embodiment, a vapor compression type refrigeration cycle device 10 is applied to a vehicle air conditioning system 1 equipped in an electric vehicle which obtains driving power for driving the vehicle from a driving electric motor. In the vehicle air conditioning system 1, the refrigeration cycle device 10 performs a function of heating or cooling ventilation air blown into a vehicle interior as an air conditioning target space. Accordingly, a heat exchange target fluid in the embodiment is ventilation air.

Figure 1:
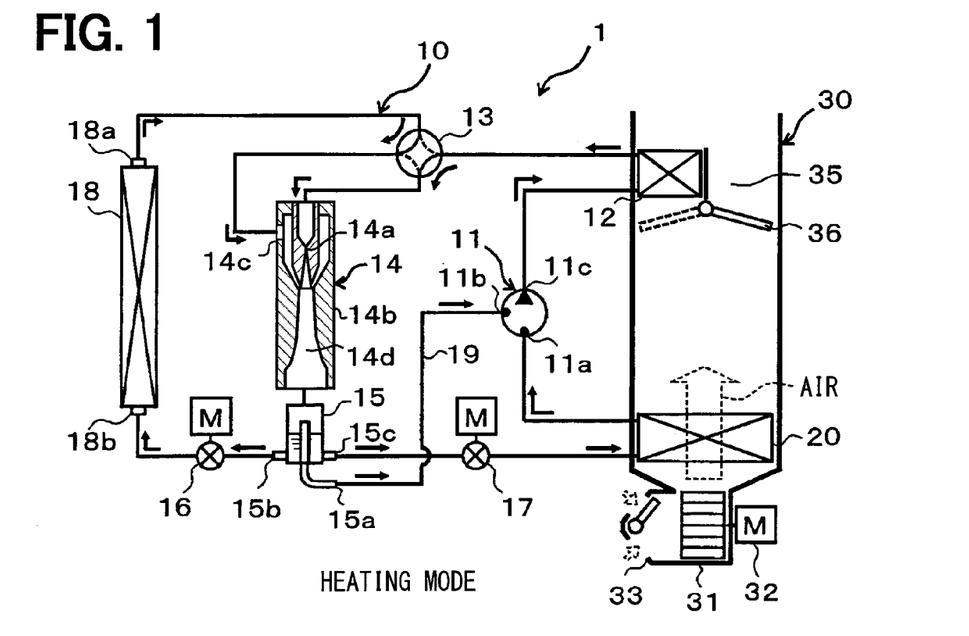
FIG. 1 is a diagram illustrating an overall configuration of a refrigerant circuit in a heating mode of a refrigeration cycle device according to a first embodiment.
Figure 2:
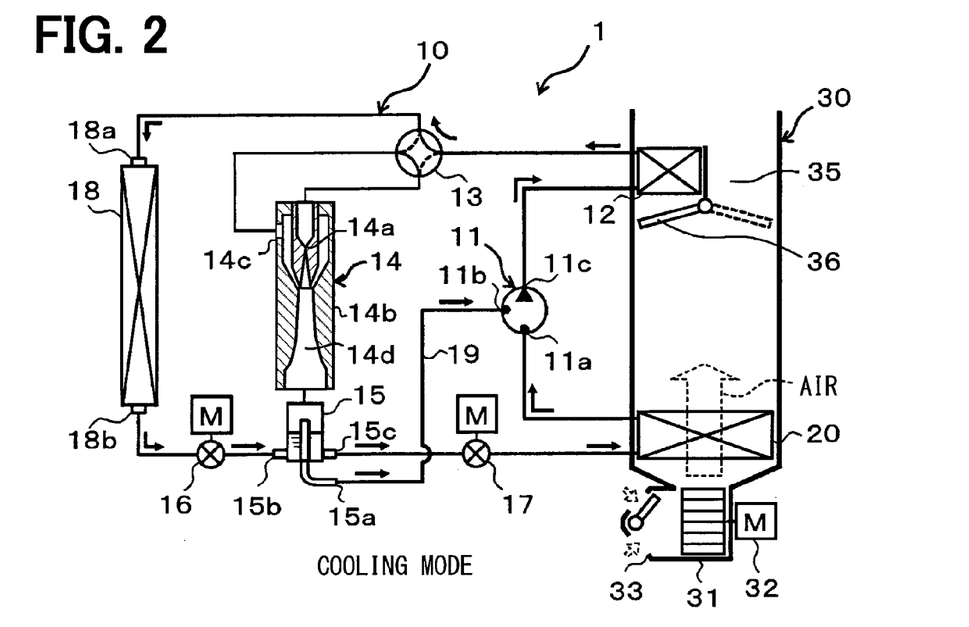
FIG. 2 is a diagram illustrating an overall configuration of a refrigerant circuit in a cooling mode of the refrigeration cycle device according to the first embodiment.

As shown in FIGS. 1 and 2, the refrigeration cycle device 10 is configured to be capable of switching between a refrigerant circuit of a heating mode (first operation mode), which heats ventilation air to heat the vehicle interior (see FIG. 1), and a refrigerant circuit of a cooling mode (second operation mode) which cools ventilation air to cool the vehicle interior (see FIG. 2). In FIGS. 1 and 2, a flow of a refrigerant in each operation mode is indicated by the solid line arrow.

In addition, the refrigeration cycle device 10 adopts an HFC refrigerant (specifically, R134a) as the refrigerant and forms a vapor compression type subcritical refrigeration cycle in which a high-pressure side refrigerant pressure Pd does not exceed a critical pressure. Of course, an HFO refrigerant (specifically, R1234yf) or the like may also be adopted. Moreover, the refrigerant is mixed with refrigerating machine oil for lubricating a compressor 11 and a portion of the refrigerating machine oil is circulated in the cycle, together with the refrigerant.

The compressor 11 is arranged in a bonnet of the vehicle, and serves to introduce, compress, and then discharge a refrigerant in the refrigeration cycle device 10. The compressor 11 is a two-stage pressure boosting type electric compressor (gas injection type electric compressor) configured to accommodate two compressors such as a low-stage side compressor and a high-stage side compressor and an electric motor for rotatively driving both compressors in a housing defining an external appearance of the compressor 11.

The housing of the compressor 11 is provided with a suction port 11a through which a low-pressure refrigerant is introduced from the outside of the housing to the low-stage side compressor, an intermediate-pressure suction port 11b through which an intermediate-pressure refrigerant is introduced from the outside of the housing to the inside of the housing so as to join the refrigerant to a refrigerant in a compression process from low pressure to high pressure, and a discharge port 11c through which a high-pressure refrigerant discharged from the high-stage side compressor is discharged out of the housing.

In more detail, the intermediate-pressure suction port 11b is connected to a refrigerant discharge port of the low-stage side compressor (namely, a refrigerant suction port of the high-stage side compressor). In addition, the low-stage and high-stage side compressors may be various types of compressors such as a scroll compressor, vane compressor, and a rolling piston compressor.

The electric motor is an AC (alternating current) motor, an operation (speed of rotation) of which is controlled by an AC voltage output from an inverter (not shown). In addition, the inverter outputs an AC voltage of frequency according to control signals output from an air conditioning controller to be described later. A refrigerant discharge capability of the compressor 11 is changed by control of the frequency (speed of rotation). Accordingly, the electric motor forms a discharge capability change section of the compressor 11.

Although the embodiment has adopted the compressor 11 accommodating two compressors in one housing, the type of the compressor is not limited thereto. That is, if it is possible to introduce an intermediate-pressure refrigerant from the intermediate-pressure suction port 11b and join the intermediate-pressure refrigerant to a refrigerant in the compression process from low pressure to high pressure, the present disclosure may also adopt an electric compressor configured to accommodate one fixed displacement compressor and an electric motor for rotatively driving the compressor in a housing.

Furthermore, the present disclosure may also adopt one two-stage pressure boosting type compressor configured by both of a low-stage side compressor and a high-stage side compressor in such a manner that the two compressors are interconnected in series so that the suction port 11a of the compressor 11 as a whole is set to a suction port of the low-stage side compressor disposed at the low-stage side, the discharge port 11c of the compressor 11 as a whole is set to a discharge port of the high-stage side compressor disposed at the high-stage side, and the intermediate-pressure suction port 11b is provided at a connection section connecting a discharge port of the low-stage side compressor to a suction port of the high-stage side compressor.

The discharge port 11c of the compressor 11 is connected to a refrigerant inlet of an interior condenser 12. The interior condenser 12 is a heat exchanger for heating (first utilization-side heat exchanger), which is arranged in a casing 31 of an interior air conditioning unit 30 of the vehicle air conditioning system 1 to be described later and exchanges heat between the high-pressure refrigerant discharged from the compressor 11 (specifically, high-stage side compressor) and ventilation air after passing through an interior evaporator 20 to be described later so as to heat the ventilation air.

A refrigerant outlet of the interior condenser 12 is connected to one refrigerant inflow/outflow port of a four-way valve 13. The four-way valve 13 is a refrigerant circuit switching section which switches between the refrigerant circuit in the heating mode and the refrigerant circuit in the cooling mode, and is an electric four-way valve an operation of which is controlled according to control signals output from the air conditioning controller.

Specifically, in the heating mode, the four-way valve 13 switches over to a refrigerant circuit (circuit indicated by the solid line arrow in FIG. 1) which simultaneously connects between the refrigerant outlet of the interior condenser 12 and a refrigerant inlet of a nozzle section 14a of an ejector 14 and between one refrigerant inflow/outflow port 18a of an exterior heat exchanger 18 to be described later and a refrigerant suction port 14c formed on a body section 14b of the ejector 14. On the other hand, in the cooling mode, the four-way valve 13 switches over to a refrigerant circuit (circuit indicated by the solid line arrow in FIG. 2) which connects between the refrigerant outlet of the interior condenser 12 and one refrigerant inflow/outflow port 18a of the exterior heat exchanger 18.

In the cooling mode, the four-way valve 13 is also connected between the refrigerant inlet of the nozzle section 14a of the ejector 14 and the refrigerant suction port 14c. However, in the cooling mode, the refrigerant does not flow between the refrigerant inlet of the nozzle section 14a of the ejector 14 and the refrigerant suction port 14c. Accordingly, the ejector 14 does not function in the cooling mode.

The ejector 14 serves as a refrigerant pressure reducer for decompressing a high-pressure refrigerant and simultaneously serves as a refrigerant circulation device (refrigerant transport device) which circulates a refrigerant in the cycle by absorbing (transporting) the refrigerant by absorption action of an injection refrigerant injected at high speed.

In more detail, the ejector 14 has the nozzle section 14a and the body section 14b. The nozzle section 14a has a substantially cylindrical shape and is made of metal (for instance, brass or stainless alloy). The nozzle section 14a has a tapered shape in a refrigerant flow direction. The nozzle section 14a changes an area of a refrigerant passage formed therein to decompress a refrigerant in an isentropic manner.

The refrigerant passage formed in the nozzle section 14a has a throat section formed to have the smallest refrigerant passage area and an expansion section formed such that a refrigerant passage area thereof is gradually widened toward a refrigeration injection port through which a refrigerant is injected from the throat section. That is, the nozzle section 14a is configured as a Laval nozzle and a flow rate of the refrigerant at the throat section is set to be equal to or greater than the speed of sound. Of course, the nozzle section 14a may also be configured as a tapered nozzle.

The body section 14b has a substantially cylindrical shape and is made of metal (for instance, aluminum). The body section 14b serves as a fixed member which supports and fixes the nozzle section 14a therein and simultaneously defines an external appearance of the ejector 14. Specifically, the nozzle section 14a is press-fitted and fixed so as to be accommodated in one end side of the body section 14b in a longitudinal direction thereof. Accordingly, the refrigerant is prevented from leaking from a fixing portion (press-fitting portion) of the nozzle section 14a and the body section 14b.

In addition, a part corresponding to an outer peripheral side of the nozzle section 14a on an outer peripheral surface of the body section 14b is formed with the refrigerant suction port 14c provided so as to pass through the inside and outside of the part and communicate with the refrigeration injection port of the nozzle section 14a. In the heating mode, the refrigerant suction port 14c serves as a through hole through which a refrigerant flowing out of one refrigerant inflow/outflow port 18a of the exterior heat exchanger 18 is introduced into the ejector 14 by absorption action of the injection refrigerant injected from the nozzle section 14a.

Furthermore, the body section 14b is formed therein with a suction passage in which a suction refrigerant introduced from the refrigerant suction port 14c is guided to a diffuser section 14d, and the diffuser section 14d as a pressure increase section configured such that the injection refrigerant and the suction refrigerant introduced through the refrigerant suction port 14c and the suction passage are mixed to have an increased pressure.

The suction passage is defined in a space between an outer peripheral side around a tapered-shaped tip portion of the nozzle section 14a and an inner peripheral side of the body section 14b, and the suction passage has a refrigerant passage area which is gradually reduced in the refrigerant flow direction. Consequently, it may be possible to gradually increase a flow rate of the suction refrigerant flowing through the suction passage so as to reduce an energy loss (mixing loss) when the suction refrigerant and the injection refrigerant are mixed by the diffuser section 14d.

The diffuser section 14d is arranged so as to continue to an outlet of the suction passage and is formed to have a refrigerant passage area which is gradually widened. Consequently, the diffuser section 14d performs a function of converting velocity energy of a mixed refrigerant of the injection refrigerant with the suction refrigerant into pressure energy, namely, a function of reducing a flow rate of the mixed refrigerant to increase a pressure of the mixed refrigerant, while mixing the injection refrigerant with the suction refrigerant.

A refrigerant inlet of a gas-liquid separator 15 is connected to a refrigerant outlet of the diffuser section 14d of the ejector 14. The gas-liquid separator 15 is a gas-liquid separation section which separates gas and liquid of a refrigerant flowing into the inside thereof to accumulate a surplus refrigerant in the cycle. In addition, the gas-liquid separator 15 is provided with a gas phase refrigerant outflow port 15a through which a separated gas phase refrigerant flows out, and first and second liquid phase refrigerant outflow ports 15b and 15c through which a separated liquid phase refrigerant flows out.

The gas phase refrigerant outflow port 15a of the gas-liquid separator 15 is connected to the intermediate-pressure suction port 11b of the compressor 11 through an intermediate-pressure refrigerant passage 19. In addition, the intermediate-pressure refrigerant passage 19 has a check valve (not shown) arranged so as to allow a refrigerant to only flow from the gas phase refrigerant outflow port 15a of the gas-liquid separator 15 to the intermediate-pressure suction port 11b of the compressor 11.

In addition, the first liquid phase refrigerant outflow port 15b of the gas-liquid separator 15 is connected to the other refrigerant inflow/outflow port 18b of the exterior heat exchanger 18 through a first variable throttle valve 16. The second liquid phase refrigerant outflow port 15c is connected to a refrigerant inlet of the interior evaporator 20 through a second variable throttle valve 17.

Each of the first and second throttle valves 16 and 17 is an electric variable throttle valve which includes a valve body configured such that an opening degree is variable and an electric actuator configured of a stepping motor for changing the opening degree of the valve. In addition, operations of the first and second throttle valves 16 and 17 are controlled according to control signals (control pluses) output from the air conditioning controller.

The exterior heat exchanger 18 is a heat exchanger which exchanges heat between a refrigerant flowing therein and outside air blown from a blower fan (not shown). Furthermore, the exterior heat exchanger 18 serves as an evaporator which evaporates the refrigerant flowing into the inside thereof to exhibit heat absorption action during the heating mode, and serves as a radiator which radiates heat to the refrigerant flowing into the inside thereof in the cooling mode.

The interior evaporator 20 is a heat exchanger for cooling (second utilization-side heat exchanger), which is arranged upstream of the interior condenser 12 in a ventilation air flow direction, in the casing 31 of the interior air conditioning unit 30, and evaporates a refrigerant flowing therein by exchanging heat with ventilation air before passing through the interior condenser 12, thereby cooling the ventilation air by exhibiting heat absorption action. The suction port 11a of the compressor 11 is connected to a refrigerant outlet of the interior evaporator 20.

Next, the interior air conditioning unit 30 will be described. Since the interior air conditioning unit 30 serves to blow ventilation air having a temperature regulated by the refrigeration cycle device 10 into the vehicle interior, the interior air conditioning unit 30 is arranged inside a dashboard (instrument panel) at the foremost portion of the vehicle interior. Furthermore, the interior air conditioning unit 30 is configured to accommodate a blower 32, an interior evaporator 20, an interior condenser 12, etc. in the casing 31 defining an external appearance of the interior air conditioning unit.

Since the casing 31 forms an air passage for ventilation air blown into the vehicle interior, the casing 31 has a certain degree of elasticity and is made of resin (for instance, polypropylene) having high elasticity. An inside/outside air switching device 33 as an inside/outside air switching section, which switches between inside air (vehicle interior air) and outside air (vehicle exterior air) and introduces the same into the casing 31, is arranged at the most upstream side of the ventilation air flow in the casing 31.

The inside/outside air switching device 33 continuously adjusts opening areas of an inside air introduction port, through which inside air is introduced into the casing 31, and an outside air introduction port, through which outside air is introduced into the casing 31, by an inside/outside air switching door, so as to continuously vary a ratio of air volume between a volume of inside air and a volume of outside air. The inside/outside air switching door is driven by an electric actuator for inside/outside air switching door, and an operation of the electric actuator is controlled according to control signals output from the air conditioning controller.

The blower 32 as a blowing device, which blows air introduced through the inside/outside air switching device 33 toward the vehicle interior, is arranged downstream of the inside/outside air switching device 33 in the ventilation air flow direction. The blower 32 is an electric blower which drives a centrifugal multi-blade fan (sirocco fan) by an electric motor, and a speed of rotation (air flow rate) of the blower 32 is controlled according to control signals output from the air conditioning controller.

The interior evaporator 20 and the interior condenser 12 are sequentially arranged downstream of the blower 32 in the ventilation air flow direction. In other words, the interior evaporator 20 is arranged upstream of the interior condenser 12 in the ventilation air flow direction. In addition, a cold air bypass passage 35, in which ventilation air passing through the interior evaporator 20 bypasses the interior condenser 12 and flows downstream, is formed in the casing 31.

An air mix door 36, which adjusts a ratio of air volume allowing ventilation air after passing through the interior evaporator 20 to pass through the interior condenser 12, is arranged upstream of the interior condenser 12 in the ventilation air flow direction as well as downstream of the interior evaporator 20 in the ventilation air flow direction.

In addition, a mixing space (not shown), in which ventilation air heated by the interior condenser 12 is mixed with ventilation air passing through the cold air bypass passage 35 so as not to be heated by the interior condenser 12, is provided downstream of the interior condenser 12 in the ventilation air flow direction. Moreover, opening holes, through which the ventilation air (conditioned air) mixed in the mixing space is blown into the vehicle interior as an air conditioning target space, are disposed at the most downstream side of the ventilation air flow in the casing 31.

Specifically, the opening holes includes a face opening hole for blowing the conditioned air toward a passenger's upper half body in the vehicle interior, a foot opening hole for blowing the conditioned air toward a passenger's feet, and a defroster opening hole for blowing the conditioned air toward an inside surface of a front window glass of the vehicle (all holes being not shown). Downstream sides of the face opening hole, the foot opening hole, and the defroster opening hole in the ventilation air flow direction are connected to a face air outlet, a foot air outlet, and a defroster air outlet (all outlets being not shown) provided in the vehicle interior through respective ducts forming air passages.

Accordingly, the air mix door 36 adjusts a ratio of air volume between a volume of air passing through the interior condenser 12 and a volume of air passing through the cold air bypass passage 35, thereby allowing temperature of conditioned air mixed in the mixing space to be regulated so that the temperature of the conditioned air blown from each air outlet to the vehicle interior is regulated.

That is, the air mix door 36 serves as a temperature regulation section for adjusting the temperature of the conditioned air blown into the vehicle interior. The air mix door 36 is driven by an electric actuator for driving the air mix door, and an operation of the electric actuator is controlled according to control signals output from the air conditioning controller.

In addition, a face door for adjusting an opening area of the face opening hole, a foot door for adjusting an opening area of the foot opening hole, and a defroster door for adjusting an opening area of the defroster opening hole (all door being not shown) are respectively arranged upstream of the face opening hole, the foot opening hole, and the defroster opening hole in the ventilation air flow direction.

The face door, the foot door, and the defroster door serve as an opening hole mode switching section for switching between opening hole modes. The doors are connected to an electric actuator for driving air outlet mode doors through a link mechanism or the like so as to be rotatively operated. An operation of the electric actuator is also controlled according to control signals output from the air conditioning controller.

Specifically, the air outlet modes switched by an air outlet mode switching section include a face mode in which the face air outlet is fully opened so that air is blown from the face air outlet toward a passenger's upper half body in the vehicle interior, a bi-level mode in which both of the face air outlet and the foot air outlet are opened so that air is blown toward passenger's upper half body and feet in the vehicle interior, a foot mode in which the foot air outlet is fully opened and the defroster air outlet is slightly opened so that air is blown mainly from the foot air outlet, and a foot/defroster mode in which the foot air outlet and the defroster air outlet are equally opened so that air is blown from both of the foot air outlet and the defroster air outlet.

Furthermore, a defroster mode may also be used in which the passenger manually operates a blowing mode selection switch provided on an operation panel so that the defroster air outlet is fully opened and air is blown toward the inside surface of the front window glass of the vehicle.

Next, an electric control unit of the embodiment will be described. The air conditioning controller is configured of a known microcomputer including a CPU, a ROM, and a RAM, and peripheral circuits thereof. The air conditioning controller controls operations of various air conditioning control devices such as the compressor 11 (specifically, the inverter for driving the compressor 11), the four-way valve 13, the first and second variable throttle valves 16 and 17, and the above-mentioned electric actuators connected to an output side thereof by executing various operations and processing based on air conditioning control programs stored in the ROM.

In addition, signals detected by a group of sensors are input to an input side of the air conditioning controller. The group of sensors includes an inside air sensor as an inside air temperature detection device for detecting a vehicle interior temperature (inside air temperature) Tr, an outside air sensor as an outside air temperature detection device for detecting a vehicle exterior temperature (outside air temperature) Tam, a solar radiation sensor as a solar radiation detection device for detecting an amount of solar radiation Ts radiated into the vehicle interior, a discharge temperature sensor for detecting a discharge refrigerant temperature Td of the refrigerant discharged from the compressor 11, a discharge pressure sensor for detecting a discharge refrigerant pressure (high-pressure side refrigerant pressure) Pd of the refrigerant discharged from the compressor 11, an evaporator temperature sensor for detecting a refrigerant evaporation temperature Tefin (evaporator temperature) in the interior evaporator 20, a ventilation air temperature sensor for detecting a ventilation air temperature TAV of ventilation air blown from the mixing space to the vehicle interior, and an exterior heat exchanger temperature sensor for detecting an exterior-equipment temperature Ts of the exterior heat exchanger 18.

In the heating mode, the discharge refrigerant pressure Pd of the embodiment is a high-pressure side refrigerant pressure in the cycle reaching from the refrigerant discharge port to the inlet of the nozzle section 14a of the ejector 14. In the cooling mode, the discharge refrigerant pressure Pd is a high-pressure side refrigerant pressure in the cycle reaching from the refrigerant discharge port to the first variable throttle valve 16.

Specifically, the evaporator temperature sensor of the embodiment detects a heat exchange fin temperature in the interior evaporator 20. Of course, a temperature detection device for detecting temperatures of other portions of the interior evaporator 20 may also be adopted as the evaporator temperature sensor. In addition, although the embodiment has provided the ventilation air temperature sensor for detecting a ventilation air temperature TAV, values calculated based on the refrigerant evaporation temperature Tefin, the discharge refrigerant temperature Td, and the like may also be adopted as the ventilation air temperature TAV.

Furthermore, operation signals from various air conditioning operation switches provided on the operation panel disposed in the vicinity of the dashboard at the front portion of the vehicle interior are input to the input side of the air conditioning controller. Specifically, the various air conditioning operation switches provided on the operation panel includes an auto switch for setting or canceling an automatic control operation of the vehicle air conditioning system 1, an operation mode selection switch for switching between operation modes, an air volume setting switch for manually setting an air volume of the blower 32, a temperature setting switch as a target temperature setting section for setting a target temperature Tset of the vehicle interior, a blowing mode selection switch for manually setting a blowing mode, etc.

The air conditioning controller is integrally formed with control devices for controlling various components for air conditioning connected to the output side thereof, but the configurations (hardware and software) for controlling operations of the respective components for air conditioning serve as the control devices for controlling operations of the respective components for air conditioning.

For example, in the embodiment, the configurations (hardware and software) for controlling the operation of the compressor 11 serve as a discharge capability control device, and configurations (hardware and software) for controlling the operation of the four-way valve 13 serving as the refrigerant circuit switching section form a refrigerant circuit control device. Of course, the discharge capability control device, refrigerant circuit control device, or the like may also serve as a separate air conditioning controller in relation to the air conditioning controller.

Next, the operation of the vehicle air conditioning system 1 with the above configurations of the embodiment will be described. As described above, in the vehicle air conditioning system 1 of the embodiment, the cooling and heating mode operations may be switched.

First, in the heating mode, the air conditioning controller controls the operation of the four-way valve 13 so as to simultaneously connects between the refrigerant outlet of the interior condenser 12 and the refrigerant inlet of the nozzle section 14a of the ejector 14 and between one refrigerant inflow/outflow port 18a of the exterior heat exchanger 18 and the refrigerant suction port 14c of the ejector 14, as shown in FIG. 1.

Furthermore, the air conditioning controller adjusts the respective opening degrees of the first and second variable throttle valves 16 and 17 such that the first and second variable throttle valves 16 and 17 may exhibit a predetermined decompression capability. In more detail, the opening degrees of the first and second variable throttle valves 16 and 17 are determined such that a degree of superheat of the refrigerant at the outlet of the interior evaporator 20 is close to a predetermined reference degree of superheat SH. The opening degree of the first variable throttle valve 16 is determined such that the first variable throttle valve 16 has a greater decompression amount of refrigerant than the second variable throttle valve 17.

Consequently, in the heating mode, the air conditioning controller switches over to a refrigerant circuit in which the refrigerant flows to the compressor 11, the interior condenser 12, (the four-way valve 13), the nozzle section 14a of the ejector 14, and the gas-liquid separator 15 in this order. The gas phase refrigerant separated by the gas-liquid separator 15 is introduced into the intermediate-pressure suction port 11b of the compressor 11, and the liquid phase refrigerant separated by the gas-liquid separator 15 flows into the interior evaporator 20 through the second variable throttle valve 17 while the liquid phase refrigerant separated by the gas-liquid separator 15 flows to the first variable throttle valve 16, the exterior heat exchanger 18, (the four-way valve 13), and the refrigerant suction port 14c of the ejector 14 in this order, as indicated by the solid line arrow in FIG. 1.

With the configuration of the refrigerant circuit, the air conditioning controller reads detection signals of the group of sensors for air conditioning control and operation signals of the operation panel described above. A target blowing temperature TAO as a target temperature of air blown into the vehicle interior is calculated based on values of the read detection signals and operation signals. Moreover, operation states of various air conditioning devices connected to the output side of the air conditioning controller are determined based on the calculated target blowing temperature TAO and the detection signals of the group of sensors.

For example, the refrigerant discharge capability of the compressor 11, namely, the control signals output to the electric motor of the compressor 11 are determined as follows. First, a target condenser temperature TCO of the interior condenser 12 is determined based on the target blowing temperature TAO with reference to a control map previously stored in the air conditioning controller.

The refrigerant discharge capability of the compressor 11 is determined such that the discharge refrigerant temperature Td is close to the target condenser temperature TCO using a feedback control method or the like, based on a deviation between the target condenser temperature TCO and the discharge refrigerant temperature Td detected by the discharge temperature sensor.

In addition, the control signals output to the servo motor of the air mix door 36 are determined such that the ventilation air temperature TAV detected by the ventilation air temperature sensor is close to the target blowing temperature TAO. In the heating mode, the opening degree of the air mix door 36 may also be controlled such that a total volume of ventilation air cooled by the blower 32 passes through the interior condenser 12, as indicated by the solid line arrow in FIG. 1.

The above-determined control signals and the like are output to the various air conditioning devices. Thereafter, a control routine such as the calculation of the the target blowing temperature TAO, the operation state determination of the various air conditioning devices, or the output of the control voltages and control signals performed by reading the above detection signals and operation signals for each predetermined control period is repeated until the operation stop of the vehicle air conditioning system is requested through the operation panel. The repetition of the control routine is similarly performed even in the cooling mode.

Figure 3:
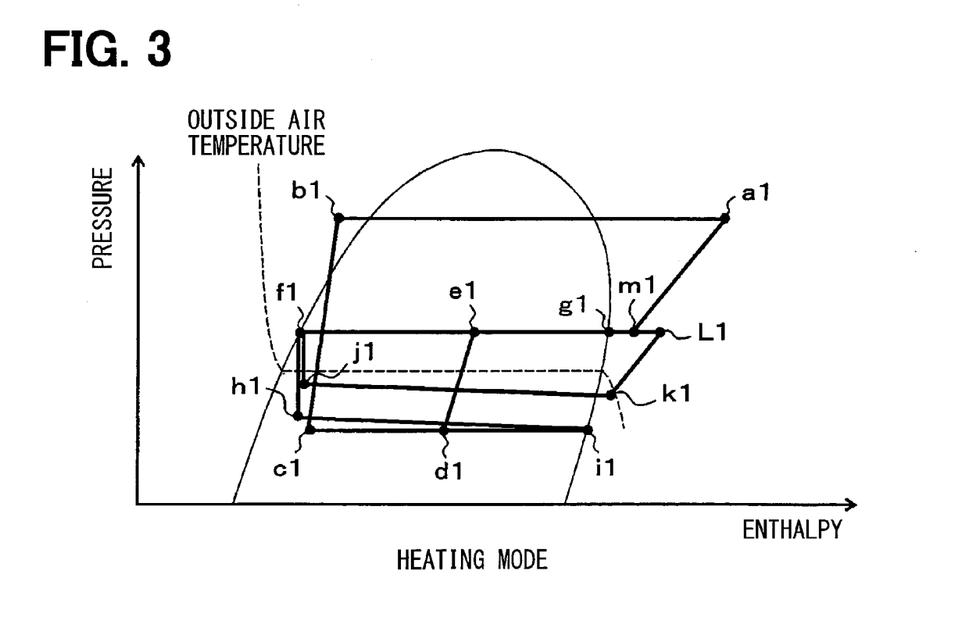
FIG. 3 is a Mollier diagram illustrating a refrigerant state in the heating mode of the refrigeration cycle device according to the first embodiment.

Accordingly, in the refrigeration cycle device 10 during the heating mode, the state of the refrigerant is changed as shown in the Mollier diagram of FIG. 3. Specifically, the high-pressure refrigerant (point a1 in FIG. 3) discharged from the compressor 11 flows into the interior condenser 12 and exchanges heat with the ventilation air cooled and dehumidified by the interior evaporator 20 to radiate heat (from point a1 to point b1 in FIG. 3). Thereby, the ventilation air after passing through the interior evaporator 20 is heated to heat the vehicle interior.

The refrigerant flowing out of the interior condenser 12 flows into the nozzle section 14a of the ejector 14 through the four-way valve 13 to be decompressed in an isentropic manner and injected (from point b1 to point c1 in FIG. 3). In the embodiment, the refrigerant passage area of the nozzle section 14a of the ejector 14 is set such that the refrigerant flowing out of the interior condenser 12 is close to a predetermined reference degree of supercooling SC during the normal operation of the heating mode, as shown in the Mollier diagram of FIG. 3.

The refrigerant flowing out of the exterior heat exchanger 18 is introduced from the refrigerant suction port 14c of the ejector 14 by absorption action of the injection refrigerant injected from the nozzle section 14a. Furthermore, the injection refrigerant injected from the nozzle section 14a and the suction refrigerant introduced through the refrigerant suction port 14c flow to the diffuser section 14d of the ejector 14 (from point c1 to point d1 and from point i1 to point d1 in FIG. 3).

In the diffuser section 14d, velocity energy of the refrigerant is converted into pressure energy by expansion of the refrigerant passage area. Consequently, while the injection refrigerant and the suction refrigerant are mixed, the pressure of the mixed refrigerant is increased (from point d1 to point e1 in FIG. 3).

The refrigerant flowing out of the diffuser section 14d flows to the gas-liquid separator 15 to be separated into gas phase and liquid phase (from point e1 to point f1 and from point e1 to point g1 in FIG. 3). The gas phase refrigerant separated by the gas-liquid separator 15 is introduced from the intermediate-pressure suction port 11b of the compressor 11 through the intermediate-pressure refrigerant passage 19 (from point g1 to point m1 in FIG. 3).

Meanwhile, in the liquid phase refrigerant separated by the gas-liquid separator 15, a refrigerant flowing into the first variable throttle valve 16 through the first liquid phase refrigerant outflow port 15b is decompressed in an isenthalpic manner by the first variable throttle valve 16 and flows into the exterior heat exchanger 18 (from point f1 to point h1 in FIG. 3). The refrigerant flowing out of the exterior heat exchanger 18 exchanges heat with outside air blown from the blower fan to be evaporated (from point h1 to point i1 in FIG. 3).

In addition, in the liquid phase refrigerant separated by the gas-liquid separator 15, a refrigerant flowing into the second variable throttle valve 17 through the second liquid phase refrigerant outflow port 15c is decompressed in an isenthalpic manner by the second variable throttle valve 17 and flows into the interior evaporator 20 (from point f1 to point j1 in FIG. 3). The refrigerant flowing out of the interior evaporator 20 exchanges heat with the ventilation air blown from the blower 32 to be evaporated (from point j1 to point k1 in FIG. 3).

The refrigerant flowing out of the interior evaporator 20 is introduced from the suction port 11a of the compressor 11 and is compressed until becoming an intermediate-pressure refrigerant by the low-stage side compressor (from point k1 to point L1 in FIG. 3). The refrigerant compressed by the low-stage side compressor is joined with the refrigerant introduced from the intermediate-pressure suction port 11b (from point L1 to point m1 and from point g1 to point m1 in FIG. 3), compressed until becoming a high-pressure refrigerant by the high-stage side compressor, and discharged (from point m1 to point a1 in FIG. 3).

As described above, in the heating mode, the ventilation air cooled by the interior evaporator 20 is reheated by the interior condenser 12 so as to realize heating of the vehicle interior. In this case, in the heating mode of the embodiment, since the exterior heat exchanger 18 functions as an evaporator to heat the ventilation air using heat absorbed from outside air, the temperature of the ventilation air is significantly increased, thereby enabling heating of the vehicle interior to be realized.

Next, the cooling mode will be described. In the cooling mode, the air conditioning controller controls the operation of the four-way valve 13 so as to simultaneously connects between the refrigerant outlet of the interior condenser 12 and one refrigerant inflow/outflow port 18a of the exterior heat exchanger 18, as shown in FIG. 2.

Furthermore, the air conditioning controller adjusts the respective opening degrees of the first and second variable throttle valves 16 and 17 such that the first and second variable throttle valves 16 and 17 may exhibit a predetermined decompression capability. In more detail, the opening degree of the first variable throttle valve 16 is determined such that a degree of supercooling of the refrigerant flowing out of the other refrigerant inflow/outflow port 18b of the interior condenser 12 is close to a predetermined reference degree of supercooling SC. In addition, the opening degree of the second variable throttle valve 17 is determined such that a degree of superheat of the refrigerant at the outlet of the interior evaporator 20 is close to a predetermined reference degree of superheat SH.

Consequently, in the cooling mode, the air conditioning controller switches over to a refrigerant circuit in which the refrigerant flows to the compressor 11, the interior condenser 12, (the four-way valve 13), the exterior heat exchanger 18, the first variable throttle valve 16, and the gas-liquid separator 15 in this order, the gas phase refrigerant separated by the gas-liquid separator 15 is introduced into the intermediate-pressure suction port 11b of the compressor 11, and the liquid phase refrigerant separated by the gas-liquid separator 15 flows into the interior evaporator 20 through the second variable throttle valve 17, as indicated by the solid line arrow in FIG. 2.

With the configuration of the refrigerant circuit, the air conditioning controller determines operation states of various air conditioning devices connected to the output side of the air conditioning controller, based on the target blowing temperature TAO and the detection signals of the group of sensors. For example, the refrigerant discharge capability of the compressor 11, namely, the control signals output to the electric motor of the compressor 11 are determined as follows. First, a target evaporator blowing temperature TEO of the ventilation air blown from the interior evaporator 20 is determined based on the target blowing temperature TAO with reference to a control map previously stored in the air conditioning controller.

The control signals output to the compressor 11 are determined such that the temperature of air passing through the interior evaporator 20 is close to the target blowing temperature TAO using a feedback control method, based on a deviation between the target evaporator blowing temperature TEO and the detention value of the evaporator temperature sensor.

In addition, the control signals output to the servo motor of the air mix door 36 are determined such that the ventilation air temperature TAV detected by the ventilation air temperature sensor is close to the target blowing temperature TAO. In the heating mode, the opening degree of the air mix door 36 may also be controlled such that a total volume of ventilation air blown from the blower 32 passes through the cold air bypass passage 35, as shown in FIG. 2.

Figure 4:
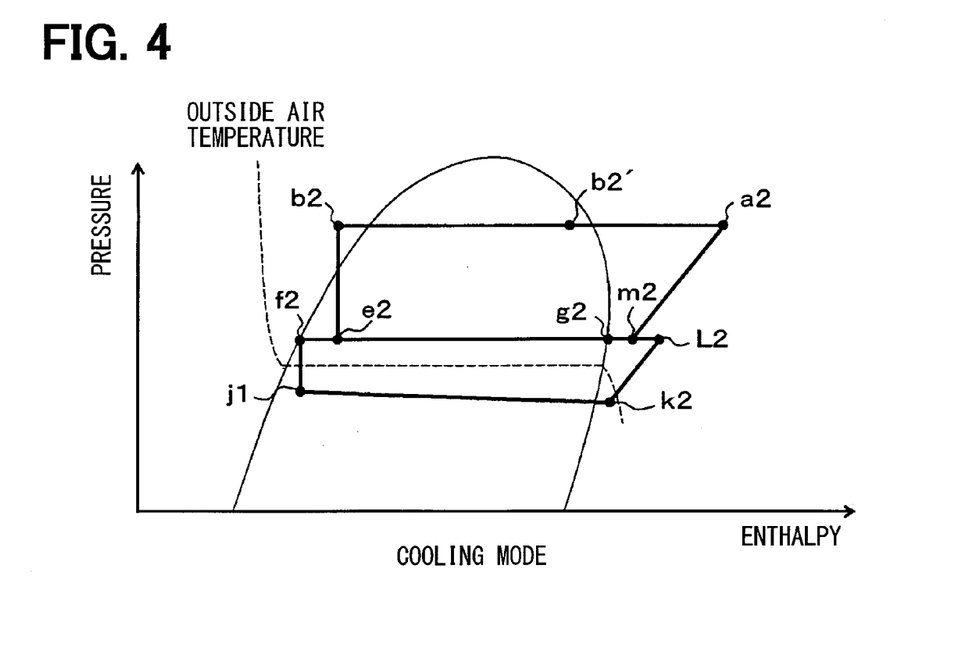
FIG. 4 is a Mollier diagram illustrating a refrigerant state in the cooling mode of the refrigeration cycle device according to the first embodiment.

Accordingly, in the refrigeration cycle device 10 during the cooling mode, the state of the refrigerant is changed as shown in the Mollier diagram of FIG. 4. Specifically, the high-pressure refrigerant (point a2 in FIG. 4) discharged from the compressor 11 flows into the interior condenser 12 and exchanges heat with the ventilation air cooled and dehumidified by the interior evaporator 20 to radiate heat (from point a2 to point b2' in FIG. 4).

The refrigerant flowing out of the interior condenser 12 flows into the exterior heat exchanger 18 from one refrigerant inflow/outflow port 18a of the exterior heat exchanger 18 through the four-way valve 13. The refrigerant flowing into the exterior heat exchanger 18 exchanges heat with the outside air blown from the blower fan to further radiate heat (from point b2' to point b2 in FIG. 4). The refrigerant flowing out of the other refrigerant inflow/outflow port 18b of the exterior heat exchanger 18 is decompressed in an isenthalpic manner by the first variable throttle valve 16 (from point b2 to point e2 in FIG. 4).

The refrigerant flowing out of the first variable throttle valve 16 flows backward into the gas-liquid separator 15 from the first liquid phase refrigerant outflow port 15b of the gas-liquid separator 15 to be separated into gas phase and liquid phase (from point e2 to point f2 and from point e1 to point g2 in FIG. 4). Similarly to the heating mode, the gas phase refrigerant separated by the gas-liquid separator 15 is introduced from the intermediate-pressure suction port 11b of the compressor 11 through the intermediate-pressure refrigerant passage 19 (from point g2 to point m2 in FIG. 4).

Meanwhile, the liquid phase refrigerant separated by the gas-liquid separator 15 flows into the second variable throttle valve 17 through the second liquid phase refrigerant outflow port 15b. The refrigerant flowing into the second variable throttle valve 17 is decompressed in an isenthalpic manner by the second variable throttle valve 17 and flows into the interior evaporator 20 (from point f2 to point j2 in FIG. 4). The refrigerant flowing into the interior evaporator 20 exchanges heat with the ventilation air blown from the blower 32 to be evaporated (from point j2 to point k2 in FIG. 4). Thereby, the ventilation air is cooled to cool the vehicle interior.

The refrigerant flowing out of the interior evaporator 20 is introduced from the suction port 11a of the compressor 11 and is compressed until becoming an intermediate-pressure refrigerant by the low-stage side compressor (from point k2 to point L2 in FIG. 4). The refrigerant compressed by the low-stage side compressor is joined with the refrigerant introduced from the intermediate-pressure suction port 11b (from point L2 to point m2 and from point g2 to point m2 in FIG. 4), compressed until becoming a high-pressure refrigerant by the high-stage side compressor, and discharged (from point m2 to point a2 in FIG. 4).

As described above, in the cooling mode, the ventilation air is cooled by the interior evaporator 20 so as to realize cooling of the vehicle interior. In this case, in the cooling mode of the embodiment, the exterior heat exchanger 18 functions as a radiator so as to radiate heat in the ventilation air to the outside air. Therefore, even when the ventilation air cooled by the interior evaporator 20 is reheated by the interior condenser 12, the temperature of the ventilation air is decreased enough to realize cooling of the vehicle interior.

The vehicle air conditioning system 1 of the embodiment may be operated as described above to realize the cooling and heating of the vehicle interior. Moreover, according to the refrigeration cycle device 10 of the embodiment, in the heating mode (first operation mode), the intermediate-pressure refrigerant decompressed by the ejector 14 may be separated into gas phase and liquid phase by the gas-liquid separator and the separated gas phase refrigerant may be introduced into the intermediate-pressure suction port 11b of the compressor 11 so as to be joined to a refrigerant in the compression process by the compressor 11. That is, the gas injection cycle may be configured during the heating mode.

In addition, in the cooling mode (second operation mode), the intermediate-pressure refrigerant decompressed by the first variable throttle valve 16 may be separated into gas phase and liquid phase by the gas-liquid separator 15 and the separated gas phase refrigerant may be introduced into the intermediate-pressure suction port 11b of the compressor 11 so as to be joined to a refrigerant in the compression process by the compressor 11. That is, the gas injection cycle may be configured during the second operation mode.

In the cooling mode, the refrigerant flowing out of the exterior heat exchanger 18 flows into the gas-liquid separator 15 through the first variable throttle valve 16. Therefore, in the heating mode, the refrigerant in the exterior heat exchanger 18 may flow backward. Thereby, the first variable throttle valve 16, which is a necessary component to decompress the intermediate-pressure refrigerant until the intermediate-pressure refrigerant becomes a low-pressure refrigerant in the heating mode, may be used to decompress the high-pressure refrigerant until the high-pressure refrigerant becomes an intermediate-pressure refrigerant in the cooling mode.

Accordingly, in the refrigeration cycle device 10 including the ejector 14 as a refrigerant pressure reducer, a complicated cycle configuration due to an increase of the number of cycle components may not be caused and the gas injection cycle may be configured in a plurality of operation modes other than the cooling mode.

In addition, the refrigeration cycle device 10 of the embodiment switches over to the refrigerant circuit in which the liquid phase refrigerant separated by the gas-liquid separator 15 flows into the interior evaporator 20 through the second variable throttle valve 17 and at the same time the liquid phase refrigerant separated by the gas-liquid separator 15 flows into the exterior heat exchanger 18 through the first variable throttle valve 16, in the heating mode.

That is, the refrigeration cycle device switches over to the refrigerant circuit in which the interior evaporator 20 and the exterior heat exchanger 18 are connected in parallel with each other with respect to the refrigerant flow. Accordingly, a refrigerant evaporation temperature in the interior evaporator 20 may be set to a different value from a refrigerant evaporation temperature in the exterior heat exchanger 18.

For example, in the heating mode of the embodiment, the refrigerant evaporation temperature in the exterior heat exchanger 18 may be set to be less than the refrigerant evaporation temperature in the interior evaporator 20 such that a decompression amount of refrigerant in the first variable throttle valve 16 is greater than a decompression amount of refrigerant in the second variable throttle valve 17. As a result, a frost may be suppressed from occurring on the interior evaporator 20 and an amount of heat absorption of the refrigerant in the exterior heat exchanger 18 may be increased.

In addition, the refrigeration cycle device 10 of the embodiment may form the gas injection cycle in the heating mode and may achieve an increase in refrigerant pressure by the ejector 14. This is advantageous in that it may be possible to effectively enhance a coefficient of performance (COP) of the cycle rather than to achieve an increase in refrigerant pressure by the ejector 14 in the cooling mode.

This is typically because compression efficiency of the compressor 11 is easily deteriorated since a pressure difference (high-low pressure difference) between discharge refrigerant pressure and suction refrigerant pressure of the compressor 11 is further enlarged in the heating mode than in the cooling mode.

[Second Embodiment]

Although the first embodiment has described an example in which the ejector 14 and the gas-liquid separator 15 forming the gas-liquid section are separately configured, the present embodiment will describe an example in which the ejector 14 and the gas-liquid separator 15 are integrated to be configured as an ejector module 50.

In a typical ejector, a diffuser section (pressure boosting section) is coaxially arranged on an axial extension of a nozzle section. Furthermore, Patent Document 2 discloses that an expansion angle of a diffuser section is set as a relatively small value to improve ejector efficiency (energy conversion efficiency of an ejector).

Accordingly, the ejector capable of exhibiting high ejector efficiency often has an elongated cylindrical shape extending in the axial direction of the nozzle section. In addition, since a typical gas-liquid separator requires a space for gas-liquid separation and a space for storing a separated liquid phase refrigerant, the size of the gas-liquid separator tends to be large.

Accordingly, in a refrigeration cycle device including the ejector and the gas-liquid separator, the ejector and the gas-liquid separator are desired to have a compact size. Therefore, the embodiment is aimed at not only miniaturizing the ejector and gas-liquid separator by integrating the ejector 14 and the gas-liquid separator 15 to be configured as an ejector module 50, but also miniaturizing the refrigeration cycle device 10 as a whole.

A specific configuration of the ejector module 50 of the embodiment will be described with reference to FIG. 5. Each arrow of upper and lower sides in FIG. 5 refers to each direction of upper and lower sides in a state in which the refrigeration cycle device 10 is mounted to the vehicle air conditioning system.

Figure 5:
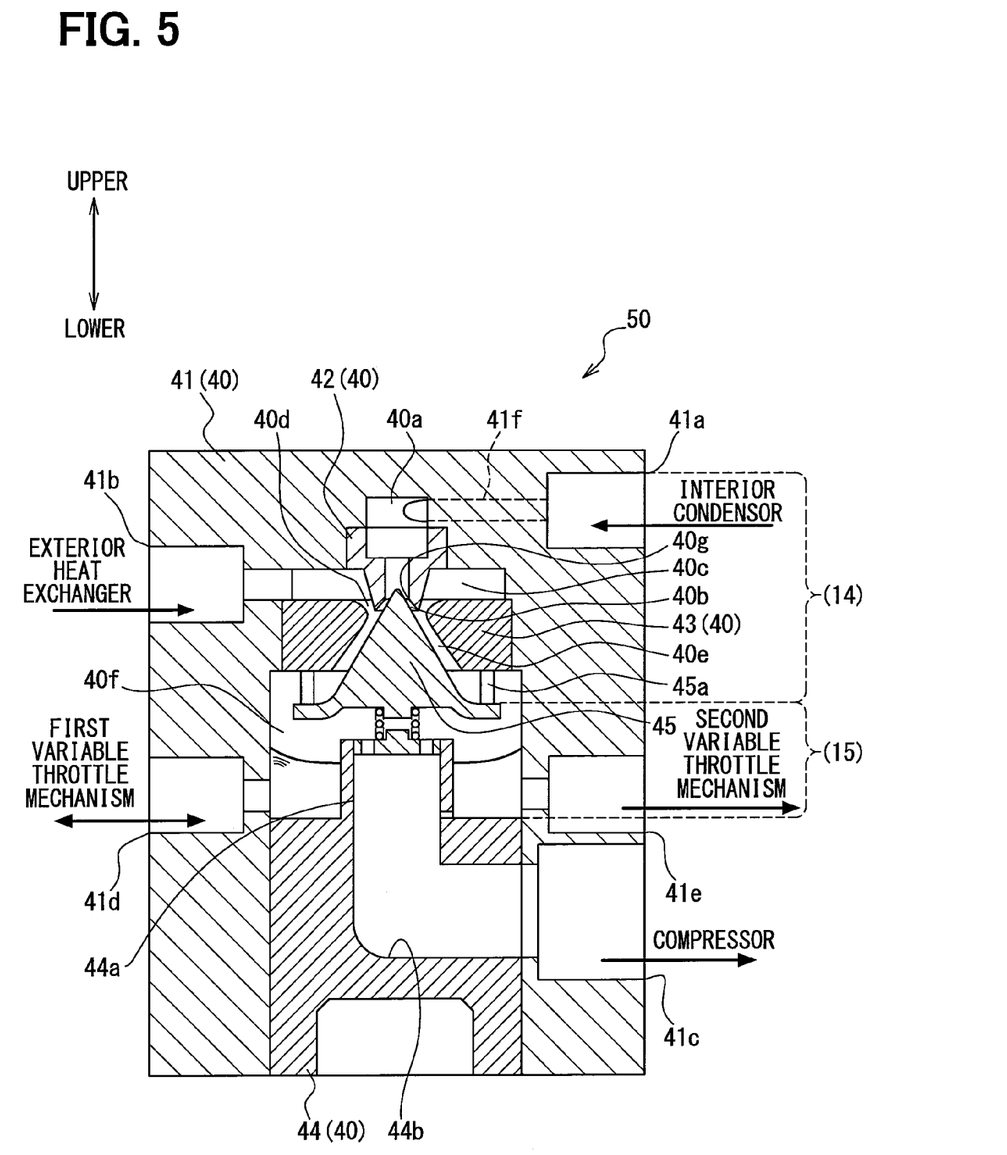
FIG. 5 is an axial cross-sectional view of an ejector module according to a second embodiment.

First, the ejector module 50 includes a body 40 configured by combination of a plurality of components, as shown in FIG. 5. Specifically, the body 40 has a housing body 41 which has a prismatic shape or a cylindrical shape and is made of metal so as to form an outer shell of the ejector module 50. A nozzle body 42, a middle body 43, a lower body 44, etc. are fixed into the housing body 41.

The housing body 41 is formed with a refrigerant inflow port 41a which is connected to one refrigerant inflow/outflow port of a four-way valve 13 so as to introduce a refrigerant flowing out of a interior condenser 12 into the inside in a heating mode, and a refrigerant suction port 41b which is connected to the other refrigerant inflow/outflow port of the four-way valve 13 so as to introduce a refrigerant flowing out of one refrigerant inflow/outflow port 18a of an exterior heat exchanger 18 into the inside in a cooling mode.

In addition, the housing body 41 is formed with a gas phase outflow port 41c through which a gas phase refrigerant separated in a gas-liquid separation space 40f formed in the body 40 flows out to an intermediate-pressure suction port 11b of a compressor 11 through an intermediate-pressure refrigerant passage 19, a first liquid phase refrigerant outflow port 41d through which a liquid phase refrigerant separated in the gas-liquid separation space 40f flows out to a first variable throttle valve 16, a second liquid phase refrigerant outflow port 41e through which the liquid phase refrigerant separated in the gas-liquid separation space 40f flows out to a second variable throttle valve 17, etc.

As is apparent from the above description, the refrigerant inflow port 41a, the refrigerant suction port 41b, the gas phase outflow port 41c, and the first and second liquid phase refrigerant outflow ports 41d and 41e in the embodiment are refrigerant inflow/outflow ports which respectively correspond to the refrigerant inflow port of the nozzle section 14a of the ejector 14, the refrigerant suction port 14c of the ejector 14, the gas phase refrigerant outflow port 15a of the gas-liquid separator 15, and the first and second liquid phase refrigerant outflow ports 15b and 15c described in the first embodiment.

The nozzle body 42 is formed of a substantially conical metal member tapered in a refrigerant flow direction and is fixed into the housing body 41 by a press-fitting manner such that an axial direction of the nozzle body 42 is parallel with a vertical direction (an upward and downward direction of FIG. 5). A whirl space 40a in which the refrigerant introduced from the refrigerant inflow port 41a whirls is formed between an upward side of the nozzle body 42 and the housing body 41.

The whirl space 40a has a rotary body shape and a central axis thereof extends in the vertical direction. In addition, the rotary body shape is a cubic shape formed when a plane figure is rotated about one straight line (central axis) on the same plane. In more detail, the whirl space 40a of the embodiment has a substantially cylindrical shape. Of course, the whirl space 40a may also have a conical shape, a shape defined by combination of a truncated cone and a cylinder, or the like.

Furthermore, a refrigerant inflow passage 41f connecting the refrigerant inflow port 41a to the whirl space 40a extends in a tangential direction of an inner wall surface of the whirl space 40a when viewed from the central axis direction of the whirl space 40a. Thereby, the refrigerant introduced from the refrigerant inflow passage 41f to the whirl space 40a flows along the inner wall surface of the whirl space 40a and whirls in the whirl space 40a.

In addition, the refrigerant inflow passage 41f need not be formed so as to perfectly coincide with the tangential direction of the whirl space 40a when viewed from the central axis direction of the whirl space 40a. If the refrigerant inflow passage 41f at least includes a component of the tangential direction of the whirl space 40a, the refrigerant inflow passage 41f may also be formed by including a component of the other direction (a component of the axial direction of the whirl space 40a).

Here, sine centrifugal force acts on the refrigerant whirling in the whirl space 40a, a refrigerant pressure at a central axis side is decreased than a refrigerant pressure at an outer peripheral side in the whirl space 40a. In the embodiment, when the refrigeration cycle device 10 is normally operated, the refrigerant pressure at the central axis side in the whirl space 40a is decreased to a pressure bring a saturated liquid phase refrigerant or to a pressure at which the refrigerant is decompressed and boiled (cavitation is generated).

The refrigerant pressure at the central axis side in the whirl space 40a may be regulated by regulating a whirling flow rate of the refrigerant whirling in the whirl space 40a. In addition, the whirling flow rate may be regulated, for example, by adjusting an area ratio between a passage cross-sectional area of the refrigerant inflow passage 41f and an axial vertical cross-sectional area of the whirl space 40a. The whirling flow rate of the embodiment means a flow rate of the refrigerant in the whirl direction thereof in the vicinity of the outermost peripheral portion of the whirl space 40a.

In addition, a decompression space 40b in which the refrigerant flowing out of the whirl space 40a is decompressed to be discharged downstream is formed in the nozzle body 42. The decompression space 40b has a rotary body shape defined by combination of a cylindrical space and a truncated cone-shaped space which is connected from a downward side of the cylindrical space to be gradually enlarged in the refrigerant flow direction. A central axis of the decompression space 40b is arranged on the same axis as the central axis of the whirl space 40a.

A valve body 45, which forms a minimum passage area section 40g having a most reduced refrigerant passage area in the decompression space 40b, is arranged in the decompression space 40b. The valve body 45 has a conical shape which is gradually enlarged toward a refrigerant flow downstream side. A central axis of the valve body 45 is arranged on the same axis as the central axis of the decompression space 40b.

In more detail, a tapered refrigerant passage in which a refrigerant passage area thereof is gradually reduced until reaching the minimum passage area section 40g toward the refrigerant flow downstream side and an expansion refrigerant passage formed downstream from the minimum passage area section 40g so that a refrigerant passage area of the expansion refrigerant passage is gradually enlarged, are formed between an inner peripheral surface of the nozzle body 42 and an outer peripheral surface of the valve body 45.

Since the decompression space 40b overlaps the valve body 45 when viewed from a radial direction in the expansion refrigerant passage having the refrigerant passage area gradually enlarged, a shape of an axial vertical cross-section of the refrigerant passage becomes an annular shape (a doughnut shape excluding a small diameter circular shape disposed on the same axis from the circular shape).

In the embodiment, by functioning the refrigerant passage formed between the inner peripheral surface of the nozzle body 42, which forms the decompression space 40b by the passage shape, and the outer peripheral surface of the valve body 45 as a nozzle, the flow rate of the refrigerant decompressed by the refrigerant passage is increased so as to be close to the speed of sound.

In other words, a nozzle section of the embodiment is configured by the refrigerant passage formed between an inner peripheral surface of a portion, which forms the decompression space 40b of the nozzle body 42, and an outer peripheral surface on an upstream side of the valve body 45 in the refrigerant flow direction. In addition, in the refrigerant passage functioning as the nozzle, the refrigerant introduced from the whirl space 40a flows while whirling along the refrigerant passage having an annular cross-sectional shape.

Next, the middle body 43 is formed of a metal disc member provided with a rotary body-shaped through-hole passing through front and rear surfaces in a central portion thereof. A central axis of the through-hole is arranged on the same axis as the central axes of the whirl space 40a and decompression space 40b. In addition, the middle body 43 is fixed into the housing body 41 and to the downward side of the nozzle body 42 by a press-fitting manner.

An inflow space 40c for retaining the refrigerant introduced from the refrigerant suction port 41b is formed between an upper surface of the middle body 43 and an inner wall surface of the housing body 41 facing the upper surface. In the embodiment, in order to position a tapered tip portion of the downward side of the nozzle body 42 in the through-hole of the middle body 43, the inflow space 40c has an annular cross-sectional shape when viewed from the central axis direction of the whirl space 40a and decompression space 40b.

In a range in which the downward side of the nozzle body 42 is inserted, namely, a range in which the middle body 43 overlaps the nozzle body 42 when viewed from the radial direction, in the through-hole of the middle body 43, a refrigerant passage cross-sectional area is gradually reduced in the refrigerant flow direction so as to correspond to an outer peripheral shape of the tapered tip portion of the nozzle body 42.

Thereby, the inflow space 40c communicates with the refrigerant flow downstream side of the decompression space 40a, so that a suction passage 40d in which the refrigerant is introduced from the refrigerant suction port 41b is formed between the inner peripheral surface of the through-hole and the outer peripheral surface of the downward side of the nozzle body 42. The suction passage 40d also has an annular cross-sectional shape when viewed from the central axis direction.

Furthermore, a pressure boosting space 40e, which has a substantially truncated con shape gradually enlarged in the refrigerant flow direction, is formed in a range of the downward side of the suction passage 40d in the through-hole of the middle body 43. The pressure boosting space 40e is a space in which an injection refrigerant injected from the above-mentioned refrigerant passage functioning as a nozzle is mixed with a suction refrigerant introduced from the suction passage 40d.

The downward side of the above-mentioned valve body 45 is disposed in the pressure boosting space 40e. An expansion angle of a conical side surface of the valve body 45 is smaller than an expansion angle of a truncated cone-shaped space of the pressure boosting space 40e. Accordingly, a refrigerant passage formed between the inner peripheral surface of the pressure boosting space 40e and the outer peripheral surface of the valve body 45 has a conical cross-section shape when viewed from the central axis direction. A refrigerant passage area of the refrigerant passage is gradually enlarged toward the refrigerant flow downstream side.

In the embodiment, by enlarging the refrigerant passage area, the refrigerant passage formed between the inner peripheral surface of the middle body 43 forming the pressure boosting space 40e and the outer peripheral surface of the valve body 45 functions as a diffuser and velocity energy of the injection refrigerant and the suction refrigerant is converted into pressure energy.

In other words, a diffuser section of the embodiment is configured by the refrigerant passage formed between an inner peripheral surface of a portion, which forms the pressure boosting space 40e of the middle body 43, and an outer peripheral surface on a downstream side of the valve body 45 in the refrigerant flow direction. In addition, in the refrigerant passage functioning as the diffuser, by a velocity component in the whirl direction having the injection refrigerant injected from the refrigerant passage functioning as the nozzle, the refrigerant flows while whirling along the refrigerant passage having an annular cross-sectional shape.

In addition, a plurality of leg sections 45a are provided in the most downward portions of the valve body 45, and the valve body 45 is fixed to the body 40 (specifically, to a bottom side of the middle body 43) by the leg sections 45a. Accordingly, a refrigerant passage in which the refrigerant flows is formed between the respective leg sections 45a.

Next, the lower body 44 is formed of a cylindrical metal member, and is fixed into the housing body 41 by fastening screws such that the bottom of the housing body 41 is blocked. The gas-liquid separation space 40f, in which gas and liquid of the refrigerant flowing out of the above-mentioned refrigerant passage functioning as the diffuser are separated, is formed between an upward side of the lower body 44 and the middle body 43.

The gas-liquid separation space 40f is formed as a rotary body-shaped space having a cylindrical shape. A central axis of the gas-liquid separation space 40f is arranged on the same axis as the central axes of the whirl space 40a, the decompression space 40b, the pressure boosting space 40e, and the like.

As described above, in the refrigerant passage functioning as the diffuser, since the refrigerant flows while whirling along the refrigerant passage of the annular cross-section shape, the refrigerant flowing into the gas-liquid separation space 40f from the refrigerant passage functioning as the diffuser also has a velocity component. Accordingly, the gas and liquid of the refrigerant are separated in the gas-liquid separation space 40f by action of centrifugal force.

A central portion of the lower body 44 is provided with a cylindrical pipe 44a which is coaxially arranged in the gas-liquid separation space 40f to extend toward the upward side. The liquid phase refrigerant separated in the gas-liquid separation space 40f is stored in the outer peripheral side of the pipe 44a. The inside of the pipe 44a is formed with a gas phase refrigerant outflow passage 44b in which the gas phase refrigerant separated in the gas-liquid separation space 40f is introduced to the gas phase refrigerant outflow port 41c of the housing body 41.

As is apparent from the above description, in the ejector module 50 of the embodiment, a configuration corresponding to the ejector 14 of the first embodiment is realized by the refrigerant passage formed at the refrigerant flow upstream side further than the gas-liquid separation space 40f, and a configuration corresponding to the gas-liquid separator 15 of the first embodiment is realized by the gas-liquid separation space 40f.

That is, in the ejector module 50 of the embodiment, the refrigerant inlet side of the gas-liquid separation section is connected to the refrigerant outflow port of the diffuser section of the ejector so that the ejector is integrated with the gas-liquid separation section. In FIG. 5, portions which generally correspond to the ejector 15 and the gas-liquid separator 15 of the first embodiment are designated by reference numerals 14 and 15.

Other configurations of the refrigeration cycle device 10 and other operations of the vehicle air conditioning system 1 are identical to those of the first embodiment. Accordingly, in the refrigeration cycle device 10 including the ejector 14 as a refrigerant pressure reduction section even in the refrigeration cycle device 10 of the embodiment, a complicated cycle configuration may not be caused and the gas injection cycle may be configured in a plurality of different operation modes from the refrigerant circuit.

Furthermore, since the embodiment adopts the ejector module 50, the ejector and the gas-liquid separator may be effectively miniaturized. In more detail, in the ejector module 50 of the embodiment, the pressure boosting space 40e and the valve body 45 have a rotary body shape and simultaneously have a truncated cone shape which is gradually enlarged in the radial direction toward the refrigerant flow downstream side.

Consequently, the refrigerant passage functioning as the diffuser may be formed to be enlarged radially outwardly from the axial central side. Accordingly, the axial dimension may be decreased compared to the typical ejector in which the diffuser section is arranged on the axial extension of the nozzle section. Furthermore, since the refrigerant flows while whirling in the refrigerant passage functioning as the diffuser, the passage for increasing the pressure of the refrigerant is formed in a spiral shape and thus the axial dimension may be more decreased.

In addition, since the refrigerant introduced from the refrigerant passage, which has the annular cross-section shape and functions as the diffuser, previously whirls in the gas-liquid separation space 40f of the embodiment, it is not necessary to provide a space for generating or increasing the whirl flow of the refrigerant in the gas-liquid separation space 40f. Accordingly, in a case in which the gas-liquid separation section is provided separately from the ejector, the capacity of the gas-liquid separation space 40f may be effectively reduced.

As a result, according to the ejector module 50 of the embodiment, it may be possible to not only miniaturize the ejector and the gas-liquid separator (specifically, a configuration functioning as the ejector and a configuration functioning as the gas-liquid separator) but also miniaturize the refrigeration cycle device 10 as a whole.

In addition, according to the ejector module 50 of the embodiment, since the refrigerant whirls in the whirl space 40a and the refrigerant having a reduced pressure at the whirl central side flows into the decompression space 40b, the refrigerant may be reliably decompressed and boiled in the vicinity of the minimum passage area section 40g. Consequently, energy conversion efficiency (corresponding to nozzle efficiency) in the refrigerant passage functioning as the nozzle may be improved.

Although, in the ejector module 50 of the embodiment, an example in which two liquid phase outflow ports such as the first and second liquid phase outflow ports 41d and 41e are provided in the body 40 has been described, a configuration in which any one of them is removed and one liquid phase outflow port is provided may also be used.

A branch section of a three-way joint structure for branching the flow of the refrigerant may be connected to one liquid phase outflow port so that the first and second variable throttle valves 16 and 17 are interconnected through the branch section.

[Other Embodiment]

The disclosure is not limited to the above-mentioned embodiments and the following changes may be made without departing from the principles and spirit of the disclosure.

Although the above-mentioned embodiments have described an example in which the refrigeration cycle device 10 of the present disclosure is applied to the vehicle air conditioning system 1, the refrigeration cycle device 10 of the present disclosure may exhibit a high COP when ventilation air (a heat exchange target fluid) is heated.

Accordingly, the refrigeration cycle device 10 of the present disclosure is effectively applied to a vehicle, in which engine waste heat is insufficient as a heat source for heating, such as a hybrid vehicle which obtains driving power for driving the vehicle from an engine (internal combustion engine) and a driving electric motor. In addition, the refrigeration cycle device 10 of the present disclosure may also be applied to, for example, a stationary air conditioning system, a cold and warm storage unit, a liquid heating and cooling system, and the like.

Although each of the above-mentioned embodiments has described an example in which the fixed nozzle section having a fixed throttle passage area is adopted as the nozzle section of the ejector, a variable nozzle section configured such that the throttle passage area is variable may also be adopted.

For example, the ejector 14 of the first embodiment may adopt a configuration of having a needle valve for adjusting the refrigerant passage area of the nozzle section disposed in the nozzle section and a drive device for displacing the needle valve in the axial direction of the nozzle section. In addition, the ejector module 50 of the second embodiment may adopt a configuration of having a drive device for displacing the valve body 45 in the axial direction.

In addition, as the drive device, an electric actuator configured of a stepping motor may also be adopted, and a configuration of connecting the needle valve or the valve body 45 to a diaphragm changed according to received pressures may also be adopted. Particularly, in the ejector module 50 of the second embodiment, when the drive device is arranged to the outer peripheral side of the middle body 43 between the inflow space 40c and the pressure boosting space 40e, the axial dimension of the whole ejector module 50 is not increased.

Furthermore, in the heating mode, the operation of the variable nozzle section may also be controlled such that the degree of supercooling of the refrigerant at the outlet side of the interior condenser 12 is close to a predetermined reference degree of supercooling.

Each of the above-mentioned embodiments has described the detailed configuration of the interior condenser 12. However, as the interior condenser 12, a so-called sub-cool type condenser configured to have a condensation section for heating and condensing a high-pressure refrigerant, a receiver section which separates gas and liquid of the refrigerant flowing out of the condensation section and accumulates a liquid phase refrigerant, and a supercooling section for supercooling the liquid phase refrigerant flowing out of the receiver section may also be adopted.

When the sub-cool type condenser is adopted, the supercooling liquid phase refrigerant reliably may flow into the whirl space 40a of the ejector module 50 described in the second embodiment and the pressure of the refrigerant at the whirl central side may be decreased. Consequently, energy conversion efficiency (corresponding to nozzle efficiency) in the refrigerant passage functioning as the nozzle may be stably improved.

What is claimed is:

1. A refrigeration cycle device comprising:
a compressor that introduces, compresses, and then discharges a refrigerant;
a first utilization-side heat exchanger that exchanges heat between the refrigerant discharged from a discharge port of the compressor and a heat exchange target fluid;
a second utilization-side heat exchanger that exchanges heat between the refrigerant and the heat exchange target fluid, and causes the refrigerant to flow into a suction port of the compressor;
an exterior heat exchanger that exchanges heat between the refrigerant and outside air;
an ejector having a pressure boosting section, an ejector suction port and a nozzle section, when refrigerant passes through the nozzle section the refrigerant is decompressed; in the pressure boosting section a first portion of the refrigerant which is jetted from the nozzle section is mixed with a second portion of the refrigerant drawn from the ejector suction port by absorption action of the injection of the first portion of the refrigerant jetted from the nozzle section, so as to increases a pressure of the first portion o the re refrigerant mixed with the second portion of the refrigerant;
a gas-liquid separation section in which the refrigerant flowing out of the ejector is separated into gas phase refrigerant and liquid phase refrigerant;
an intermediate-pressure refrigerant passage that causes the gas phase refrigerant separated in the gas-liquid separation section to be introduced to an intermediate-pressure suction port provided in the compressor and to be joined to the refrigerant, that enters the compressor port from the second utilization-side heat exchanger, in a compression process of the compressor;
a first variable throttle valve decompressing the refrigerant flowing through a refrigerant passage that connects the exterior heat exchanger to the gas-liquid separation section;
a second variable throttle valve decompressing the refrigerant flowing through a refrigerant passage that connects the second utilization-side heat exchanger to the gas-liquid separation section;
a refrigerant circuit switching section that switches a refrigerant circuit in which the refrigerant is circulated in a cycle; and
a controller, the controller being configured to operate the refrigerant circuit in a first operation mode and a second operation mode, wherein
in the first operation mode, the refrigerant flowing out of the first utilization-side heat exchanger flows into the nozzle section, and the liquid phase refrigerant separated in the gas-liquid separation section comprises a first liquid phase refrigerant portion and a second liquid phase refrigerant portion, wherein the first liquid phase refrigerant portion flows out the gas-liquid separation section through a first outlet port into the second utilization-side heat exchanger through the second variable throttle valve and at the same time the second liquid phase refrigerant portion flows out of the gas-liquid separation section through a second outlet port through the first variable throttle valve, the exterior heat exchanger, and the ejector suction port in this order, and
in the second operation mode, the refrigerant flowing out of the first utilization-side heat exchanger flows through the exterior heat exchanger, the first variable throttle valve, and the gas-liquid separation section in this order, and the liquid phase refrigerant separated in the gas-liquid separation section flows into the second utilization-side heat exchanger through the second variable throttle valve.

2. The refrigeration cycle device according to claim 1, wherein a decompression amount of the refrigerant in the first variable throttle valve is greater than a decompression amount of the refrigerant in the second variable throttle valve, in the first operation mode.

3. The refrigeration cycle device according to claim 1, wherein the ejector and the gas-liquid separation section are integrated with each other to configure an ejector module by connecting a refrigerant inlet side of the gas-liquid separation section to a refrigerant outflow port of the pressure boosting section.

4. The refrigeration cycle device according to claim 3, wherein the ejector module comprises:

a body section provided with a whirl space in which the refrigerant is introduced from a refrigerant inflow port for introduction of the refrigerant whirls, a decompression space in which the refrigerant flowing out of the whirl space is decompressed, a suction passage communicating with a refrigerant downstream side of the decompression space to draw the refrigerant from an outside, a pressure boosting space in which the first portion of the refrigerant jetted from the decompression space is mixed with the second portion of the refrigerant introduced from the suction passage so as to increase a pressure of the first portion of the refrigerant mixed with the second portion of the refrigerant, and a gas-liquid separation space in which the refrigerant flowing out of the pressure boosting space is separated into the gas phase refrigerant and the liquid phase refrigerant; and a valve body at least a portion of which is arranged in the decompression space so as to form a minimum passage area section having a most reduced refrigerant passage area in the decompression space, wherein the nozzle section is defined by a refrigerant passage formed between an inner peripheral surface of a first portion, which forms the decompression space of the body section, and an outer peripheral surface of the valve body, the pressure boosting section is defined by a refrigerant passage formed between an inner peripheral surface of a second portion, which forms the pressure boosting space of the body section, and the outer peripheral surface of the valve body, and the gas-liquid separation section is defined by the gas-liquid separation space.

* * * * *